US006651708B2

(12) United States Patent
Gloor et al.

(10) Patent No.: US 6,651,708 B2
(45) Date of Patent: Nov. 25, 2003

(54) CLOSING DEVICE FOR A FILLING PIPE ARRANGED ON A CONTAINER

(75) Inventors: Christian Gloor, Sevelen (CH); René Dancet, Rapperswil/BE (CH); Walter Furgler, Mels (CH)

(73) Assignees: Stag AG, Maienfeld (CH); Holcim (Schweiz) AG, Zürich (CH)

( * ) Notice: Subject to any disclaimer, the term of this patent is extended or adjusted under 35 U.S.C. 154(b) by 0 days.

(21) Appl. No.: 10/265,829

(22) Filed: Oct. 7, 2002

(65) Prior Publication Data

US 2003/0044264 A1 Mar. 6, 2003

Related U.S. Application Data

(63) Continuation of application No. PCT/CH02/00155, filed on Mar. 18, 2002.

(51) Int. Cl.[7] .............................. B65B 1/04; B65B 3/00; B67C 3/00
(52) U.S. Cl. ..................... 141/360; 141/362; 141/383; 141/386; 220/254.4; 220/86.2
(58) Field of Search .......................... 141/18, 29, 234, 141/237, 267, 268, 283, 311 R, 348–355, 360, 362, 383, 386; 220/252, 254.4, 254.6, 86.2; 215/235–245

(56) References Cited

U.S. PATENT DOCUMENTS

| | | | |
|---|---|---|---|
| 1,152,286 A | * 8/1915 | Brownson ................ 220/822 |
| 1,870,973 A | 8/1932 | Thwaits | |
| 4,921,120 A | * 5/1990 | Mizioch ................ 220/254.2 |
| 4,979,470 A | 12/1990 | Anderson | |
| 5,263,521 A | * 11/1993 | Brossard et al. ............ 141/384 |
| 6,095,365 A | 8/2000 | Yielding | |

FOREIGN PATENT DOCUMENTS

| | | |
|---|---|---|
| EP | 0 249 726 A | 12/1987 |
| EP | 0 976 670 A | 2/2000 |

* cited by examiner

*Primary Examiner*—Timothy L. Maust
(74) *Attorney, Agent, or Firm*—Henry M. Feiereisen; Ursula B. Day

(57) ABSTRACT

A closing device for a container for use arranged on a rail-bound or road vehicle and movable to a loading station for charging powder-like or granular bulk material is provided with at least one filling pipe (5.3), and includes a closure element (40) arranged in the container interior (7) on a carrier arm (50), which is swingable in substantially horizontal plane, and swingable by a pivot assembly (65), associated to the filling pipe (5.3), relative to the filling pipe (5.3), which has a portion projecting into the interior (7), into a sealing engagement in and disengagement from the inlet opening (24), and wherein a cover (6.3), designed as weather protection, is further arranged to the outside of the filling pipe (5.3) and held to the filling pipe (5.3) in form-fitting or force-locking manner.

26 Claims, 8 Drawing Sheets

CLOSING DEVICE FOR A FILLING PIPE ARRANGED ON A CONTAINER

CROSS-REFERENCES TO RELATED APPLICATIONS

This application is a continuation of prior filed copending PCT International application no. PCT/CH 02/00155, filed Mar. 18, 2002.

This application claims the priority of Swiss Patent Application Serial No. CH 2001 0507/01, filed Mar. 19, 2001, pursuant to 35 U.S.C. 119(a)–(d), the subject matter of which is incorporated herein by reference.

BACKGROUND OF THE INVENTION

The invention relates to a closing device for a filling pipe arranged on a container, and in particular refers to a closing device for a filling pipe for at least one container arranged on a rail-bound or road vehicle and moveable to a loading station for charging powder-like or granular bulk material, wherein the individual container has at least one filling pipe connected via an inlet opening with the interior of the container and closeable on the outside by a cover.

It is generally known to use rail-bound or road vehicles with one or more containers disposed thereon for loading and transport of bulk material, in particular powder-like bulk material in the form of cement or the like, wherein the containers have each at least one filling pipe for charging purposes in a loading station provided with one or more silo containers. When charging each container, the cover (weather protection) arranged on the filling pipe is initially removed or swung open relative to the filling pipe, and subsequently a charging head, connected with the silo container, is introduced into the filling pipe and container interior. After charging and removing the charging head, the cover is re-attached for transport onto the filling pipe, e.g. by means of a screw connection or the like. The container has further on one end a pipe for admission of pressure and on the other opposite end an outlet pipe for emptying under compressed air, when the filling pipe is closed and the outlet pipe is open.

Known transport containers experience the problem that the cover as well as the means for their securement are exposed to external conditions (summer and winter operation) and become severely contaminated during charging with dusty material such as cement or the like. Removal of the cover arranged on the filling pipe can be carried out only under consideration of respective safety regulations after relative time-consuming and cost-intensive cleansing of the cover and the fastening means. Moreover, the individual fastening means (screw connections) as well as the cover, which closes the filling pipe, are no longer operational after a relatively short period and have to be replaced in a relatively time-consuming and cost-intensive manner.

It would therefore be desirable and advantageous to provide an improved closing device for a filling pipe arranged on a container, to obviate prior art shortcomings by providing a filling pipe, arranged on a container of the afore-stated type, with a closing device which overcomes the stated drawbacks of the mentioned prior art and enables a substantially dust-free charging of the container with respect to the elements provided on the outside in the area of the filling pipe and with respect to the environment.

SUMMARY OF THE INVENTION

According to one aspect of the present invention, a closing device according to the invention is characterized by a closure element supported in the container interior by a carrier arm and configured for engagement in and disengagement from a circular ring shaped sealing surface, associated to the inlet opening, in dependence on a pivot movement of the carrier arm whereby the pivot movement is oriented in a substantially horizontal plane, wherein the sealing surface is arranged either on an end of a hollow cylindrical insert member in coaxial relationship to the filling pipe, or on an end of the filling pipe which end projects into the container interior.

Further advantages as well as suitable further embodiments of the invention are apparent upon reading the following description in conjunction with the drawing and the individual claims.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
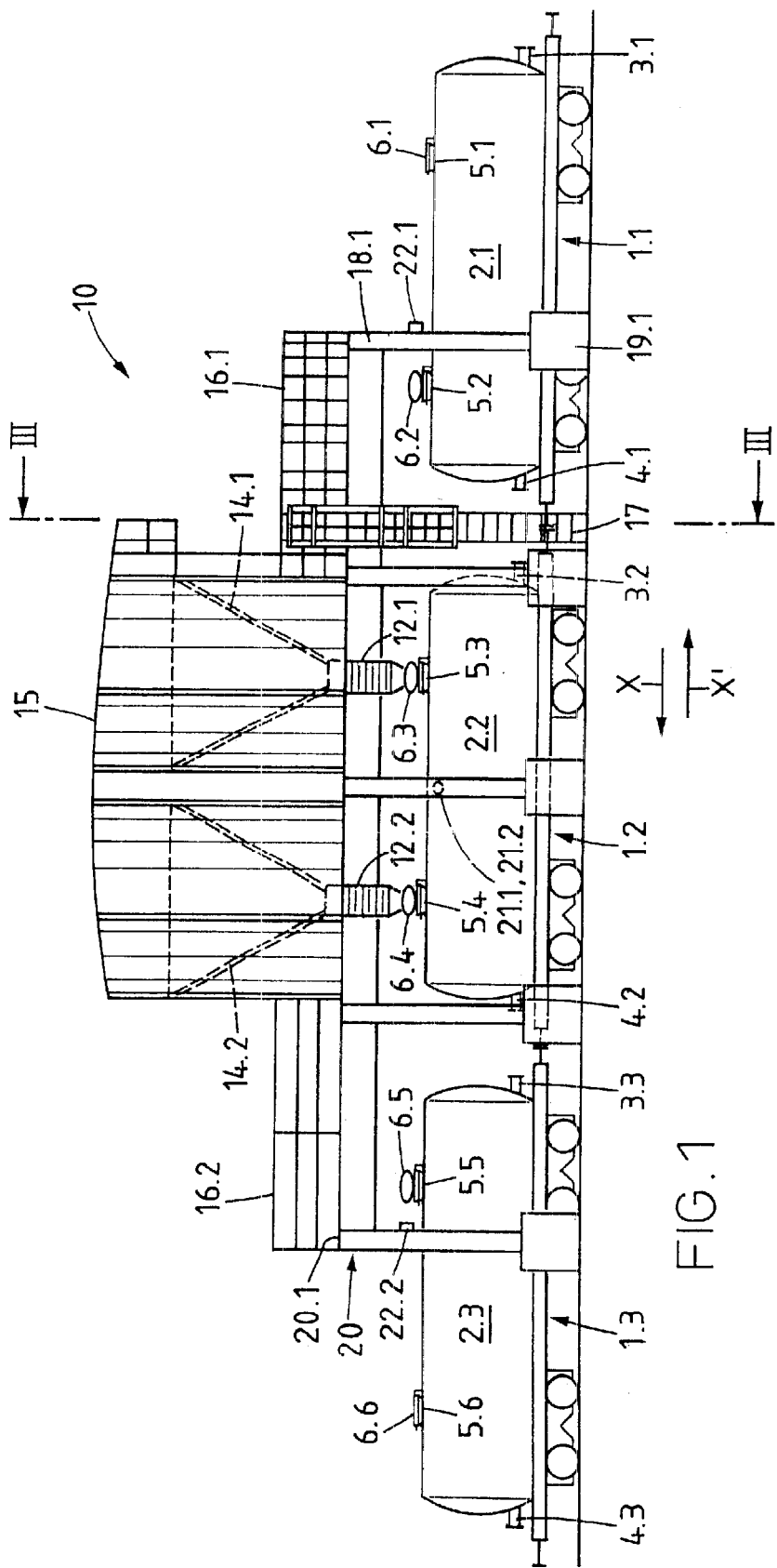
FIG. 1 is a schematic side view of a loading station for charging a transport container disposed on a railway car and provided with at least one filling pipe.

Throughout all the Figures, same or corresponding elements are generally indicated by same reference numerals.

Turning now to the drawing, and in particular to FIG. 1, there is shown for general illustration of the invention, a loading station 10, shown schematically and provided for receiving containers, arranged on a rail-bound or road vehicle, for charging powder-like or granular bulk material. In the illustrated exemplified embodiment, the loading station 10 includes a steel structure 20 provided with a platform 20.1 and supported by spaced-apart carriers on respectively associated foundations. The platform 20.1 is bounded, preferably, by a railing 16.1 and 16.2 and can be walked on by the operator via a ladder 17, arranged and secured laterally on the steel structure 20. The filling pipes, arranged on the containers, are each provided with a respectively configured closing device, which is opened by the operator for charging the container, and closed again for the transport.

For better illustration, FIG. 1 designates only two of the confronting foundations 19.1 and 19.2 with the carriers 18.1 and 18.2 supported thereon. Disposed on the platform 20.1 is a storage container 15 configured as silo and provided, for example, with two schematically illustrated discharge containers 14.1 and 14.2. Both spaced-apart discharge containers 14.1 and 14.2 taper conically in direction of an outlet opening, not shown in more detail, and are provided at their lower end with a charging head 12.1 and 12.2 arranged thereon.

In the exemplified embodiment illustrated in FIG. 1, three railway cars 1.1 to 1.3 with attached containers 2.1 to 2.3 are moved to the loading station 10. The middle railway car 1.2 is shown in precise alignment in the charging position relative to both charging heads 12.1 and 12.2 upon passage of a light barrier 21.1 and 21.2 or the like, shown schematically in FIG. 1. In the position shown in FIG. 1, both charging heads 12.1 and 12.2 are inserted in filling pipes 5.3 and 5.4, respectively arranged on the container 2.2.

At this point, it is noted that the individual filling pipes 5.3 and 5.4 can each be closed by means of an attached cover 6.3 and 6.4. Opening and closing of the cover 6.3 and 6.4, configured as weather protection, may either be implemented manually by an operator or by mechanical means arranged at the loading station. Preferably, handling modules are associated to the loading station 10 for implementing the respective motions for opening and closing the elements arranged at the respective filling pipes. The mechanical means and handling modules are not part of this invention and not shown and described in more detail.

Both charging heads 12.1 and 12.2 may be introduced in a manner not shown in more detail, for example by means of a respectively designed apparatus, into the filling pipes 5.3 and 5.4 arranged on the container 2.2. The not shown apparatus for operating the charging heads 12.1 and 12.2 are known per se and will not be described in more detail.

According to FIG. 1, the other two railway cars 1.1 and 1.3 with filling pipes 5.1 and 5.2 as well as 5.5 and 5.6 arranged thereon are respectively shown in a so-called intermediate position in dependence on the travel direction designated with arrow direction X and X'. The filling pipes supported on the railway cars 1.1 to 1.3 in spaced-apart disposition and the transport containers 2.1 to 2.3 with respectively attached cover are designated in the following description in general as container 2.1 or container 2.2 or container 2.3.

The containers 2.1 to 2.3, schematically illustrated in FIG. 1 and arranged on the railway car 1.1 to 1.3, are each provided in the illustrated exemplified embodiment with two filling pipes arranged at a distance from one another in longitudinal direction. Arranged on each of the individual filling pipes 5.1 to 5.6, each formed with a not shown through-opening, is a cover 6.1 to 6.6 by which the individual filling pipes 5.1 to 5.6 can be closed on the outside (weather protection). With respect to the one container 2.1, the cover 6.1, arranged on the filling pipe 5.1, is closed, and the cover 6.2, arranged on the filling pipe 5.2, is shown in open position. With respect to the middle container 2.2, the covers 6.3 and 6.4, arranged on the filling pipes 5.3 and 5.4, are shown in open position. With respect to the other container 2.3, the cover 6.5, arranged on the filling pipe 5.5, is still in open position, and the cover 6.6, arranged on the filling pipe 5.6, is shown in closed position.

Opening and closing of the cover 6.1 to 6.6, respectively arranged on the filling pipe 5.1 to 5.6, may be realized, instead of the handling modules, generally mentioned above, by an apparatus 22.1 and 22.2 on either end of the loading station 10, illustrated schematically in FIG. 1. Both apparatuses 22.1 and 22.2 are, preferably, so designed that the individual cover 6.1 to 6.6 is opened and closed by means of a so-called engagement runner relative to the respective filling pipe 5.1 to 5.6 in dependence on the travel direction X or X', oriented by arrows in FIG. 1. The apparatuses 22.1 and 22.2, arranged, for example, on the steel structure 20 of the loading station 10, for opening and closing the cover 6.1 to 6.6, are not part of this invention and not described in more detail.

For unloading purposes, the containers 2.1 to 2.3 are each provided with at least one pressure pipe 3.1 to 3.3 as well as with at least one outlet pipe 4.1 to 4.3. In the shown exemplified embodiment, the pressure pipes and outlet pipes are respectively arranged in opposite relationship at the forward end and rearward end of the respective container 2.1 to 2.3. The individual container 2.1 to 2.3 is acted upon with compressed air via the pressure pipes 3.1 to 3.3, when the filling pipe 5.1 to 5.6 is closed, and emptied as a result of the flow of compressed air, when the outlet pipes 4.1 to 4.3 are open.

In accordance with a further exemplified embodiment, not shown in more detail, there is the possibility to advance to the loading station a motor vehicle with at least one container arranged thereon for loading and transport of powder-like or granular material. The container arranged on the motor vehicle is loaded and unloaded in analogous manner as the containers 2.1 to 2.3, previously described and arranged on the railway cars 1.1 to 1.3. In dependence on the size of the container arranged on the motor vehicle, this container may be provided, for example, with one, two or several filling pipes arranged at a distance from one another in longitudinal direction.

Figure 2:
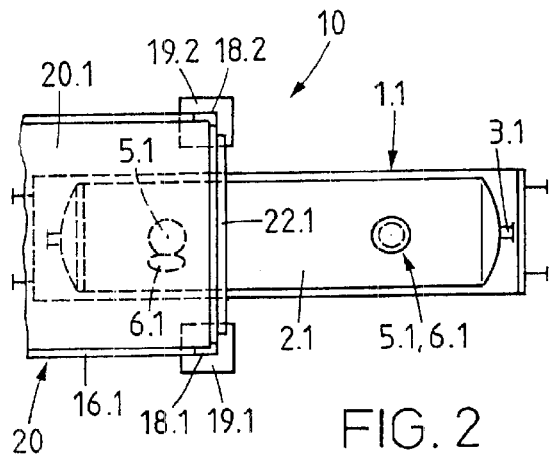
FIG. 2 is a top plan view of a portion of the loading station according to FIG. 1 with the railway car partially entering the loading station.

FIG. 2 shows a top plan view of a portion of the loading station 10, and the steel structure 20 can be seen as being supported by the carriers 18.1 and 18.2, which are arranged in confronting relationship on the foundations 19.1 and 19.2. In the position shown in FIG. 2, the railway car 1.1 with the container 2.1 has partially entered the loading station 10, whereby the one filling pipe 5.1 with the cover 6.1 is arranged outside the platform 20.1 and still closed, whereas the cover 6.2, arranged on the other filling pipe 5.2, is shown in upwardly swung position.

Figure 3:
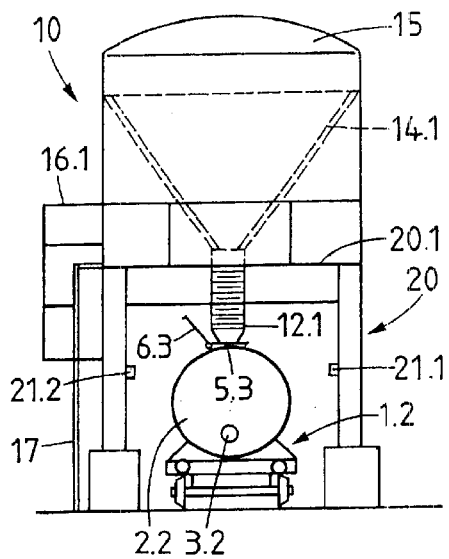
FIG. 3 is an illustration of the loading station, taken along the line III—III in FIG. 1, with the railway car and open filling pipe.

FIG. 3 depicts a schematic and sectional illustration of the loading station 10, taken along the indicated line III—III in FIG. 1, and shows the storage container 15 (silo) arranged on the platform 20.1 and including the discharge container 14.1, as well as the steel structure 20 supported on the confronting and spaced-apart foundations by means of the carrier (not labeled). FIG. 3 further shows the railway car arranged between both carriers and foundations and positioned, as viewed in travel direction, by means of the light barrier 21.1 and 21.2, and designated in its entirety with 1.2, whereby the one charging head 12.1 is introduced into the filling pipe 5.3 of the container 2.2. The charging head 12.1, having a forward outlet end of substantially funnel-shaped configuration, is, preferably, provided with a bellows which is expandable in axial direction for introduction into the filling pipe 5.3.

With reference to FIGS. 4 to 8, a closing device 25 is described hereinafter as an exemplified embodiment disposed in the container interior 7 and designed for retrofitting the filling pipe 5.3, arranged on the container 2.2. The cover 6.3 arranged on the outside of the filling pipe 5.3 is not shown in the FIGS. 4 to 8 for better illustration.

Figure 4:
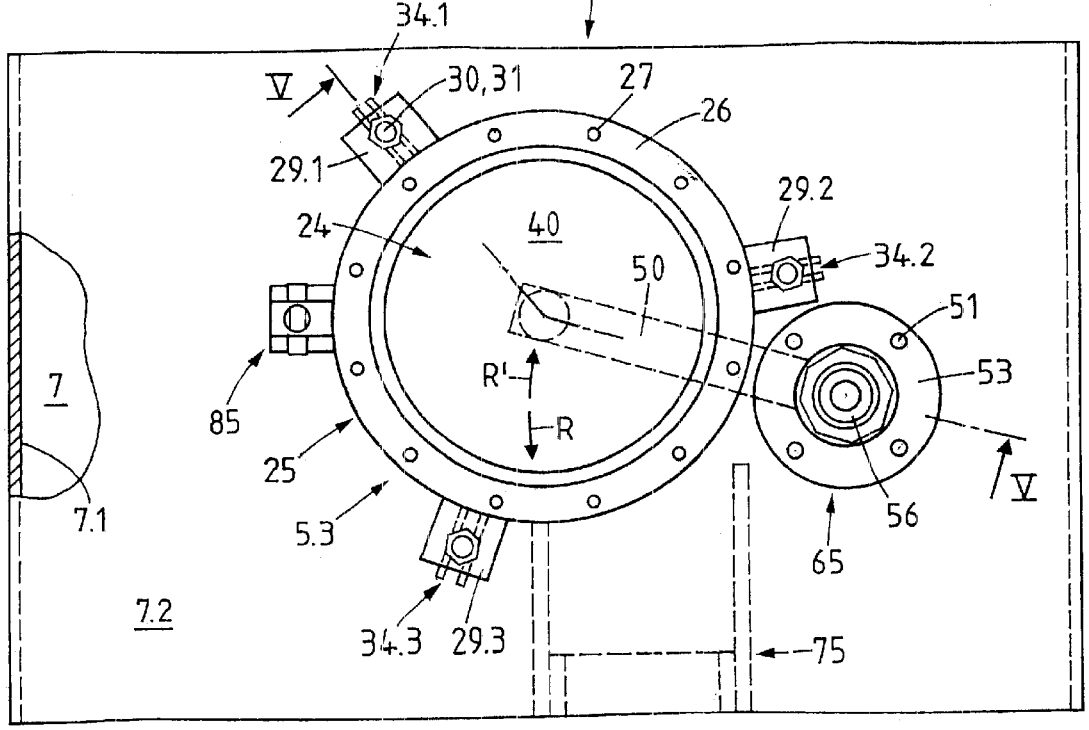
FIG. 4 is a top plan view, on an enlarged scale, of a portion of the transport container with the filling pipe and a closure element associated to the through-opening.

FIG. 4 shows a top plan view, on an enlarged scale, of a portion of the container 2.2 with broken away container wall 7.1, to illustrate partially the interior space 7 as well as the filling pipe 5.3 with the inlet opening 24. The closing device, designated in its entirety with 25, is associated to the filling pipe 5.3 and includes a substantially disk-shaped closure element 40 for closing and opening the inlet opening 24 from the inside. The closure element 40 is supported by a carrier arm 50, which is operatively connected to a pivot assembly 65, and swingable relative to the inlet opening 24 in the interior space 7 of the container 2.2 in horizontal plane according to arrow direction R and R'.

The closure element 40 is disengaged from the inlet opening 24 and secured by a holding device 75, arranged in the container interior 7, when pivoted in arrow direction R. At a pivot movement in arrow direction R', the closure element 40 is sealingly engaged again with the inlet opening 24. As schematically illustrated in FIG. 4, the closing device 25 is supported, for example by three circumferentially spaced support parts 29.1 to 29.3 upon mountings 34.1 to 34.3, which are secured to the outer side 7.2 of the container wall 7.1 and respectively secured by a screw connection 30, 31.

FIG. 4 further shows a schematically illustrated pivot bearing 85 which is arranged on the outside of the filling pipe 5.3 and provided for the cover, not shown in FIG. 4. The cover, designed as so-called weather protection, is provided for external closure of the inlet opening 24 and arranged on the filling pipe 5.3. The pivot bearing 85 arranged on the closing device 25 including the cover being arranged thereon, will still be described later.

Figure 5:
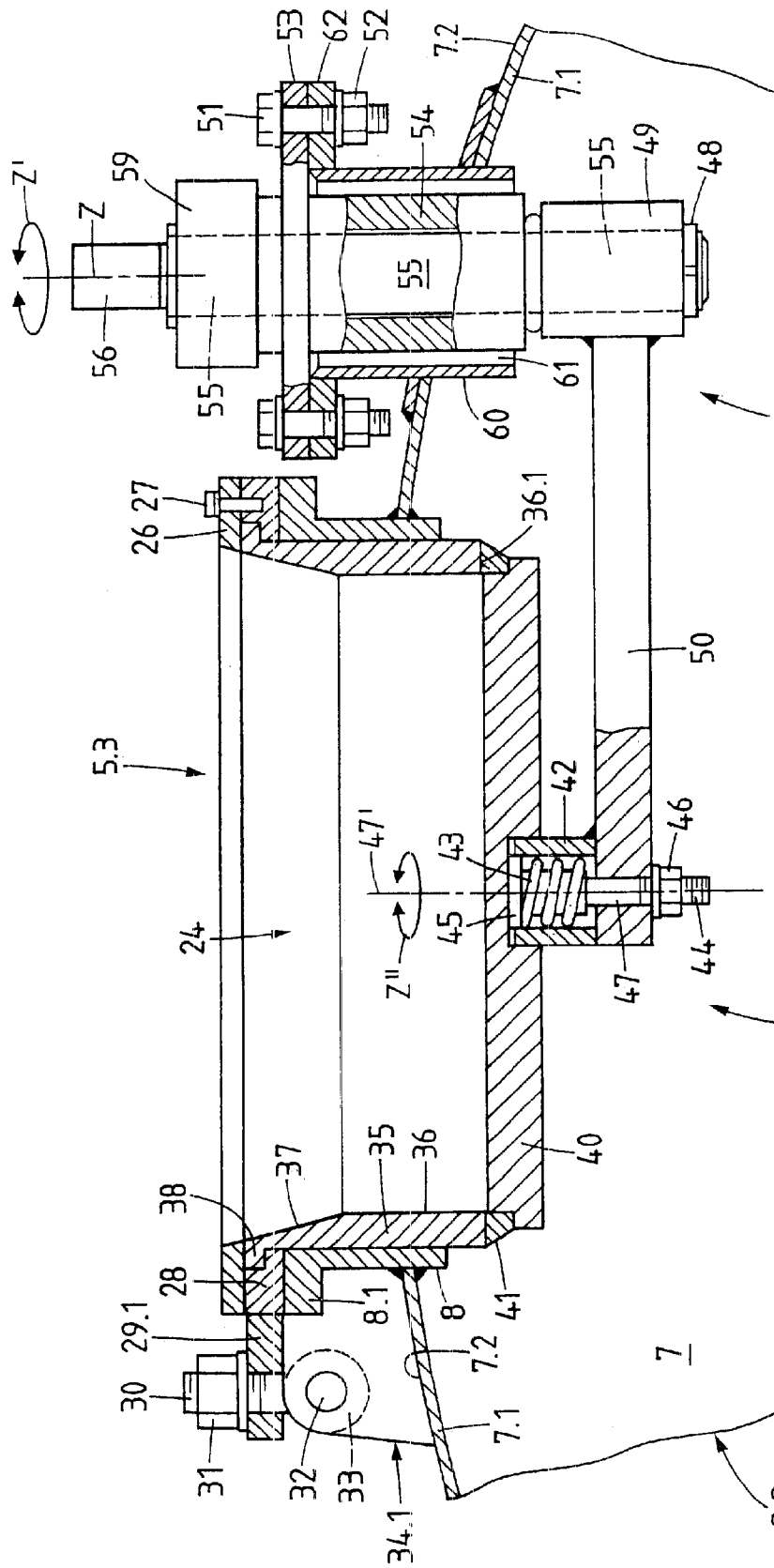
FIG. 5 a section, on an enlarged scale, of a portion of the transport container, taken along the line V—V in FIG. 4, with the closure element arranged on a pivot assembly.

FIG. 5 is a sectional view, on an enlarged scale, taken along the line V—V, of a portion of the container 2.2 with filling pipe arranged thereon and designated in its entirety with 5.3. Further shown is the pivot assembly 65 as well as the closing device 25 arranged on the carrier arm 50. In the illustrated exemplified embodiment, a tubular pipe 8, which is provided with a flange 8.1 formed therein or welded thereto, is arranged and secured in the substantially arched container wall 7.1. The hollow cylindrical tubular pipe 8 is used in the illustrated exemplified embodiment for retrofitting purposes for reception and installation of the closing device 25. A guide housing 60 is further arranged and secured in the container wall 7.1 in axis-parallel distance to the tubular pipe 8. The guide housing 60 is provided with a flange 62 for support and securement of the pivot assembly 65, projecting from outside into the container interior 7.

In the exemplified embodiment, shown in FIG. 5, the closing device 25 includes a support ring 28, which is arranged on the flange 8.1 of the tubular pipe 8, a sealing ring 26 arranged thereon, as well as an insert member 35 arranged in coaxial relationship with the tubular pipe 8 and provided with the inlet opening 24. The hollow cylindrical insert member 35 has a first cylindrical inner wall 36 as well as a second inner wall 37 which is connected to the first cylindrical inner wall and conically expands outwards with respect to the container interior 7. The inner wall 37 has a conical configuration for centered introduction of the charging heads 12.1 or 12.2 (FIG. 3). The upper end of the insert member 35 has formed thereon a circular support web 38 and arranged therewith between the support ring 28 and the sealing ring 26. The components 26, 28 and 35 are connected to one another by screws 27 in spaced-apart relationship about the circumference and arranged as a structural unit in coaxial disposition in the tubular pipe 8 of the container 2.2.

The mounting 34.1, shown as exemplified embodiment in FIG. 5 and provided for the structural unit comprised of the components 26, 28 and 35, has two webs (not labeled) which are arranged on the outside of the container wall 7.1 in spaced-apart relationship. Arranged between the webs is a bearing disk 33, respectively supported on an axle 32 and secured to the threaded bolt 30. The mountings 34.2 and 34.3, spaced apart about the circumferential direction (FIG. 4) are constructed analogous to the previously described mounting 34.1. The structural unit, comprised of the single components 35, 29.1 to 29.3 and 28, 26, is supported by the webs of the mountings 34.1 to 34.3 by means of the support parts 29.1 to 29.3, which are spaced in circumferential direction, and is secured by means of the screw connection 30,31. The structural unit may be withdrawn from the tubular pipe 8 of the container 2.2 through loosening and pivoting of the elements 30, 33, 31 about the axle 32 as a unitary structure, and, if need be, replaced by a new unit.

FIG. 5 further shows the pivot assembly 65 which is arranged in coaxial disposition in the interior space 61 of the guide housing 60 and includes essentially a sleeve 54, illustrated partially by sectional view, as well as an axle 55, extending through the sleeve in axial direction. This sleeve 54 has an upper end with attached flange 53 for support of the pivot assembly 65 by the flange 62 of the guide housing 60 and securement thereof by screw connections 51, 52 which are arranged in spaced-apart relationship in circumferential direction. The axle 55 arranged in coaxial relationship in the sleeve 54 and rotatable about the axis Z according to arrow direction Z' is provided at the upper and, projecting out of the sleeve 54, for example with a head piece 56 of polygonal configuration and held and secured in this sleeve 54 by means of a hood 59 or like that can be screwed thereon. The axle 55 projects into the container interior 7 with the lower end thereof which has arranged thereon a bearing 49 which is secured by a securing ring 48 or the like to the axle 55. The carrier arm 50 is mounted to the bearing 49 by not shown means and is provided with a tubular pipe 42 at the forward end for receiving and supporting the closure element 40.

FIG. 5 further shows the substantially disk-shaped closure element 40 arranged in the interior space 7 of the container 2.2 and supported on the tubular pipe 42 of the carrier arm 50. The closure element 40 is preferably provided with an additional sealing ring 41 on the side facing the circular ring shaped sealing surface 36.1 of the insert member 35. Arranged in the tubular pipe 42 is a bolt 47 as well as a compression spring 43, which is supported at one end by a support flange 45 of the bolt 47. The support flange 45 is configured for support of the closure element 40 provided with a respective recess (not labeled). The closure element 40 together with the sealing ring 41 arranged thereon is supported upon the tubular pipe 42 for rotation about the vertical axis 47' of the bolt 47 according to arrow direction Z', preferably in horizontal plane, relative to the swivel arm 50. The other end of the bolt 47 is provided with a threaded piece 44 as well as with a nut 46 arranged thereon by which the pressure force, applied by the closure element 40 or the sealing ring 41 arranged thereon to act on the circular ring shaped sealing surface 36.1 of the insert member 35, can be effectively adjusted.

The closure element 40 supported by the carrier arm 50 and provided with the sealing ring 41 is swingable in horizontal plane relative to the inlet opening 24 by means of the pivot assembly 65, as shown schematically in FIG. 4, and, in dependence on the movement direction R or R', can be brought sealingly into engagement or disengagement with the circular ring shaped end surface 36.1 of the insert member 35. Under consideration of the additional rotational movement of the closure element 40 in horizontal plane about the vertical axis 47' according to arrow direction Z', the closure element 40 is caused to engage the end surface 36.1 at each pivot movement into another position. In this way, the closure element 40 with the sealing ring 41 with the sealing surface is advantageously pressed against the end surface 36.1 of the insert member 35, when the position spontaneously changes, resulting in a substantially even wear off the circular ring shaped sealing surfaces.

Figure 6:
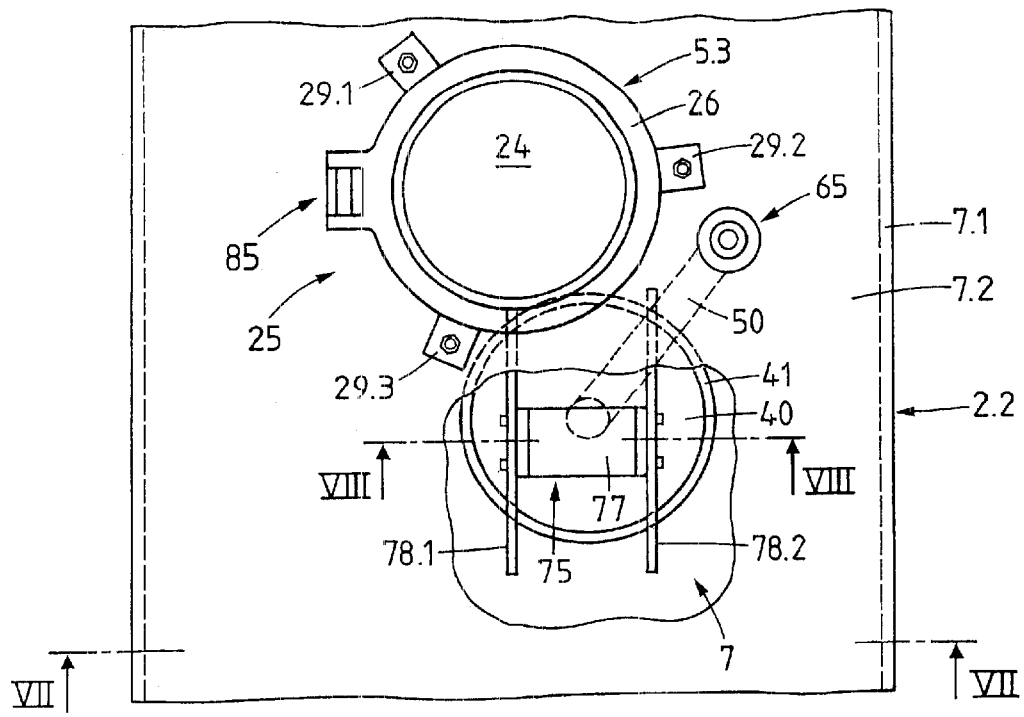
FIG. 6 is a top plan view of a portion of the transport container with the closure element pivoted relatively to the through-opening.

FIG. 6 is a schematic top plan view of a portion of the transport container 2.2 according to FIG. 4 and illustrates the filling pipe 5.3 with the closing device 25 for the inlet opening 24. The closing device 25 is supported upon the upper outer side 7.2 of the container wall 7.1 by means of the support parts 29.1 to 29.3 spaced in circumferential direction. The container wall 7.1 is partly broken away in FIG. 6 to show the closure element 40 provided with the attached sealing ring 41 and pivoted relative to the through-opening 24 by means of the pivot assembly 65. Arranged at the inside of the container wall 7.1 is the holding device 75 provided with two slide rails 78.1 and 78.2 as well as an interposed spacer piece 77, for the pivot movement of the closure element 40 in horizontal plane. During the pivot movement, the closure element 40 is pressed by the action of the compression spring 43 (FIG. 5), arranged in the tubular pipe 42 of the carrier arm 50, against the narrow sides of the slide rails 78.1 and 78.2 arranged in the movement range of the closure element 40 and against the circular ring shaped sealing surface 36.1 of the insert member 35 in the closing position. In dependence on the movement direction of the closure element 40, as indicated by arrow direction R or R' in FIG. 4, the closure element 40 is either caused to sealingly engage the inlet opening 24, or, as shown in FIG. 6, pivoted relative thereto to cause disengagement from the inlet opening 24.

Figure 7:
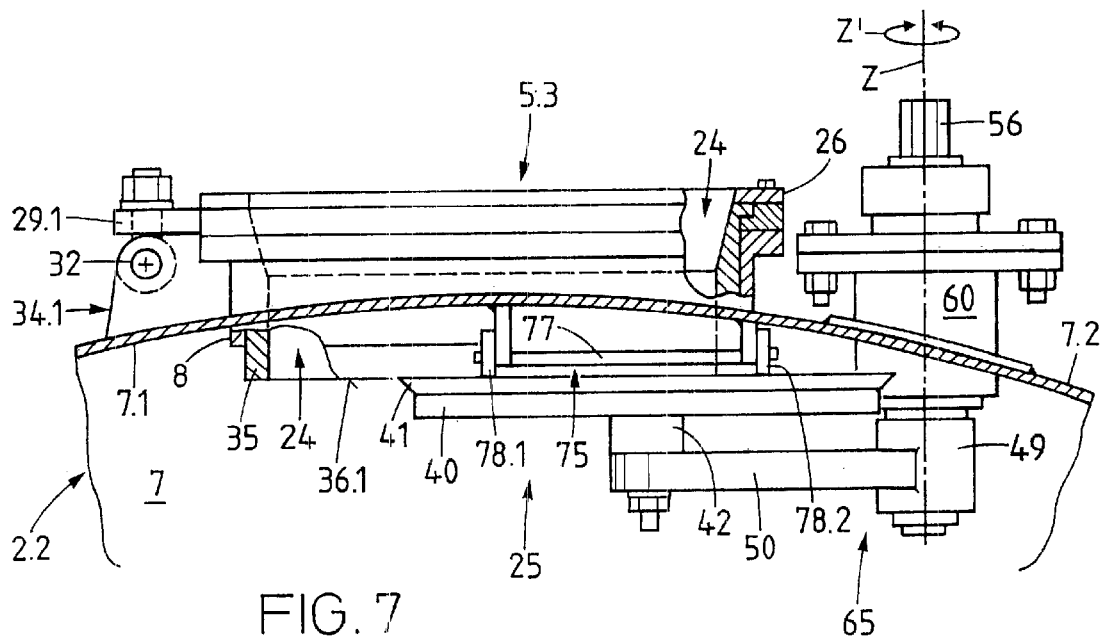
FIG. 7 is a portion of the transport container, taken along the line VII—VII indicated in FIG. 6, with the pivoted closure element.

FIG. 7 is a sectional view, taken along the line VII—VII in FIG. 6, of the portion of the transport container 2.2 with the filling pipe 5.3 partly broken away, to show the attached closing device 25 as well as the pivot assembly 65 with the closure element 40. The closure element 40 partly abuts in FIG. 7 the sealing surface 36.1 of the insert member 35 and is shown in a pivoted position relative to the through-opening 24. The closure element 40, supported by the carrier arm 50, is guided during the pivot movement relative to the through-opening 24, on the one hand, upon the sealing surface 36.1 of the insert member 35, and, on the other hand, upon the narrow sides of both spaced-apart slide rails 78.1 and 78.2 of the mounting 75.

Figure 8:
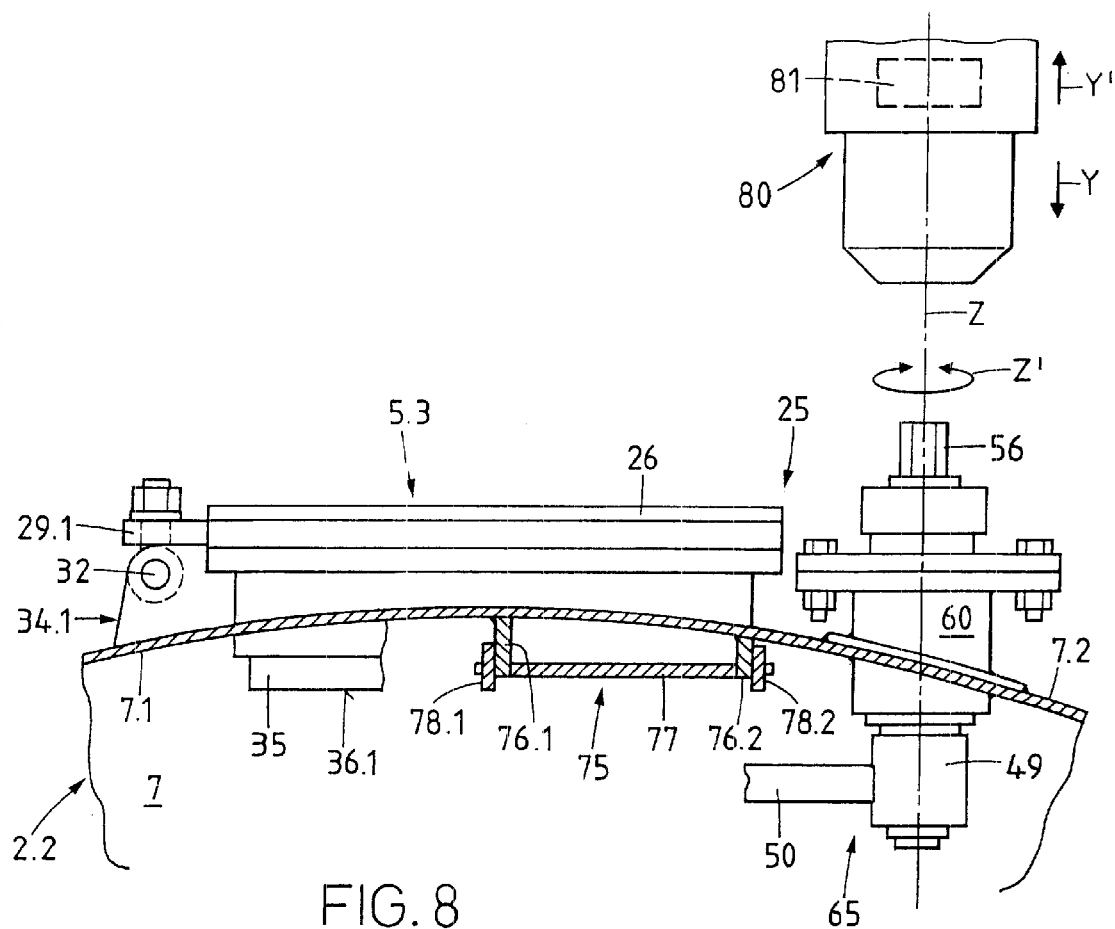
FIG. 8 is a portion of the transport container, taken along the line VIII—VIII in FIG. 6, with guide disposed therein for the closure element.

FIG. 8 is a sectional view, taken along the line VIII—VIII in FIG. 6 of the portion of the transport container 2.2, to show the filling pipe 5.3 with attached closing device 25 as well as the associated pivot assembly 65 with partly illustrated carrier arm 50. Arranged in the container interior 7 upon the container wall 7.1 is the holding device 75 which includes both slide rails 78.1 and 78.2 as well as the interposed spacer piece 77 provided with both webs 76.1 and 76.2. Arranged on both webs 76.1 and 76.2 of the spacer piece 77 are both slide rails 78.1 and 78.2 oriented in longitudinal direction in the interior space 7 of the container 2.2 and secured by a not shown screw connection. Both slide rails 78.1 and 78.2 are arranged, preferably randomly adjustable, upon the webs 76.1 and 76.2 with respect to the circular ring shaped sealing surface 36.1 of the insert member 35.

At this point, it should be noted that the operation of the pivot assembly 65 for actuating the closure element 40, arranged in the container interior 7, by suitable means (not shown) can be implemented manually by the operator or automatically by an operating or handling module (robot).

FIG. 8 shows a schematic exemplified embodiment of an operating or handling module 80 adjustable by not shown means relative to the head piece 56 of the pivot assembly 65 in arrow direction Y or Y'. The operating or handling module 80 can be aligned by not shown means in relation to the polygonal head piece 56 of the pivot assembly 65 and caused to engage for activation of the pivot assembly according to arrow direction Y. The operating or handling module 80 is operatively connected with a drive 81 in such a manner that the head piece 56 is rotatable about the vertical axis Z in arrow direction Z'. In dependence on the movement direction, the closure element 40, arranged on the carrier arm 50, is, as shown in FIG. 4, caused to sealingly engage the inlet opening 24 according to arrow direction R', or to disengage according to arrow direction R.

Figure 9B:
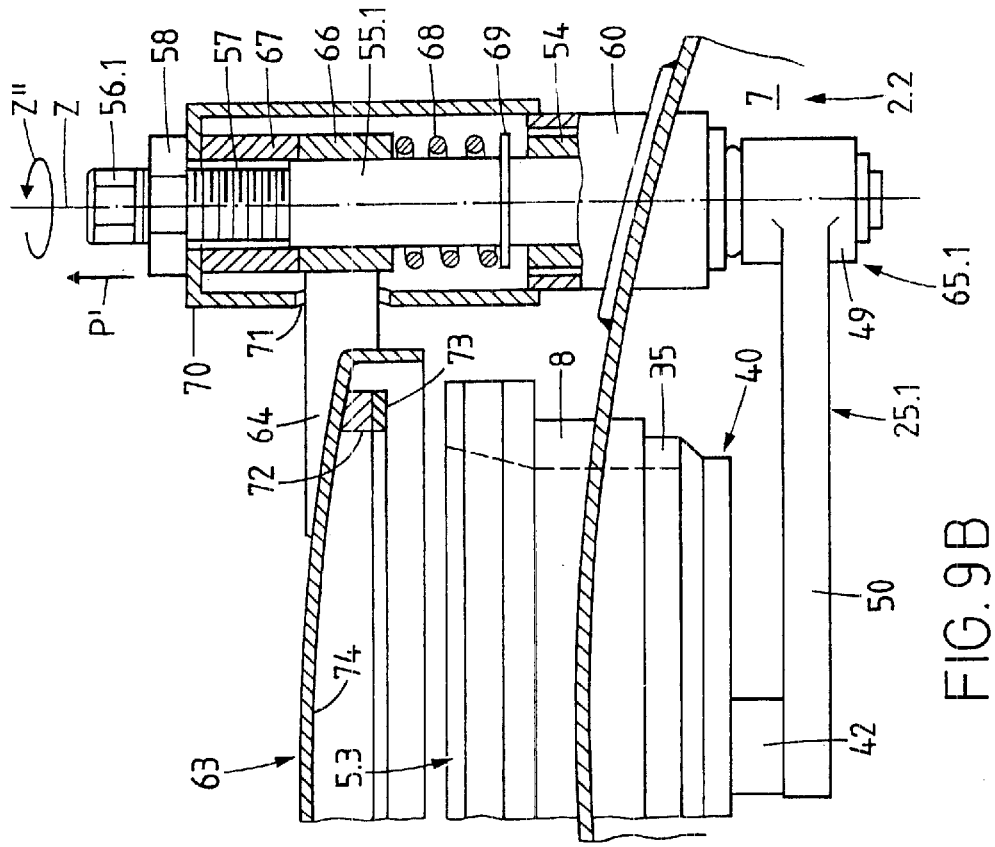
FIG. 9B is the pivot assembly according to FIG. 9A with cover lifted relative to the filling pipe for the pivot movement oriented in horizontal plane.
Figure 9A:
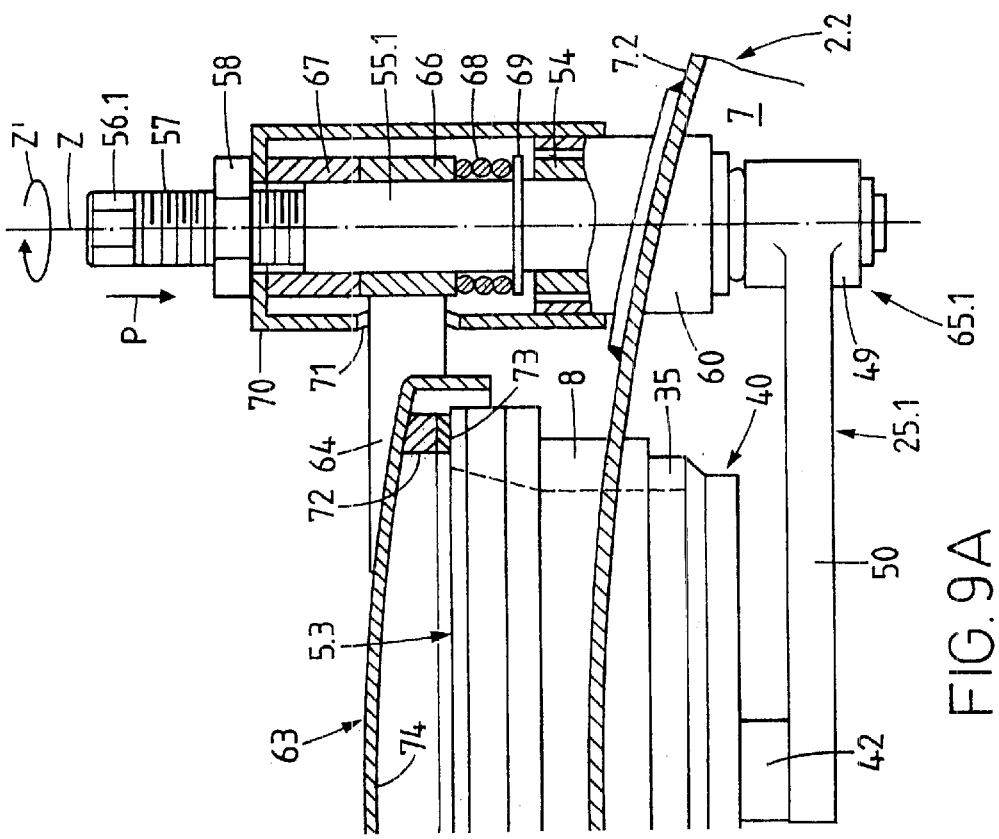
FIG. 9A is an illustration of a variation of the pivot assembly for the closure element as well as a swingable cover arranged on the outside of the filling pipe and movable relative thereto in horizontal plane.

FIG. 9A and FIG. 9B. show as further variation a pivot assembly 65.1 arranged on the container 2.2. The pivot assembly 65.1 is configured for a pivot movement of the closing device 25.1, arranged in the container interior 7, in substantially horizontal plane, as well as for a cover 63 which closes the filling pipe 5.3 from the outside and is movable relative thereto in horizontal plane. The closing device 25.1 is substantially designed analogous to the closing device 25, described previously in conjunction with FIG. 5 and includes the guide housing 60 arranged on the container 2.2, the guide sleeve 54 arranged therein, an axle 55.1 supported therein in coaxial relationship, as well as the carrier arm 50, operatively connected therewith at the lower end, for the closure element 40. The closure element 40 is, preferably, supported by the carrier arm 50 analogous to the exemplified embodiment of FIG. 5 for rotation in horizontal plane.

Differing from the exemplified embodiment according to FIG. 5, the variation according to FIG. 9A shows the arrangement of a support flange 69 upon the axle 55.1 for a compression spring 68, a bearing sleeve 66 as well as a spacer sleeve 67. The bearing sleeve 66 is operatively connected to the axle 55.1 by not shown means and has arranged thereon at least one carrier arm 64 configured for securement of the substantially hood-shaped cover 63. The axle 55.1 is provided at the upper end with a polygonal head piece 56.1 as well as with an attached outer thread 57. Arranged on the outer thread 57 is a screw piece 58. The elements of the pivot assembly 65.1, arranged outside the container 2.2, are arranged, preferably, in a housing 70 designed as protective cap. The housing 70 has a recess 71 for the carrier arm 64, wherein the recess 71 is designed in correspondence to the pivot movement about the vertical axis Z in arrow direction Z' or Z' of the carrier arm 64, arranged upon the cover 63.

FIG. 9A is a sectional view of the substantially hood-shaped cover 63 and illustrates the carrier arm 64 arranged with one end thereon as well as a mounting 72, arranged on the inner side 74 of the cover 63, for a circular ring shaped seal 73. A rotational movement of the screw piece 58, supported by the housing 70, by not shown means about the vertical axis Z in arrow direction Z', the cover 63 is moved according to the arrow direction P indicated in FIG. 9A and thereby sealingly pressed with the seal 73 against the filling pipe 5.3. The compression spring 68, arranged in the housing 70, is substantially compressed, when the cover 63 is closed (FIG. 9A).

The individual elements are moved in view of the return force of the compression spring 68 in the arrow direction P', indicated in FIG. 9B, as the screw piece 58 is rotated by not shown means about the vertical axis Z in arrow direction Z', to thereby lift the cover 63 relative to the filling pipe 5.3. The compression spring 68 is so designed and dimensioned as to ensure a lifting movement in arrow direction P'. Instead of the compression spring 68, configured in the form of a helical spring, it is also possible to arrange a respectively designed disk spring assembly (not shown) upon the axle 55.1.

In the position shown in FIG. 9B. the axle 55.1 provided with the polygon 56.1 can be rotated by not shown means about the vertical axis Z in narrow direction Z'. The rotational movement realizes a pivoting of the cover 63, operatively connected essentially with the axle 55.1, relative to the filling pipe 5.3. During pivot movement of the cover 63, the closure element 40, supported by the carrier arm 50, can be pivoted at the same time in horizontal plane relative to the insert member 35, projecting into the container interior 7.

A variation for realizing a compulsory operation of the cover 6.3, arranged on the filling pipe 5.3, will now be described with reference to FIGS. 10A to 10F, wherein FIGS. 10A to 10D illustrate the opening and FIG. 10E as well as 10F illustrate the closing of the cover 6.3.

Figure 10A:
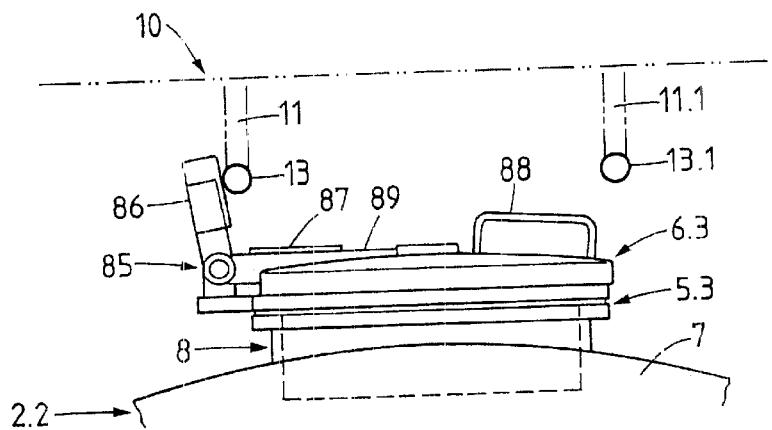
FIGS. 10A to 10F show each a portion of the transport container with the filling opening and the cover swingably supported relative thereto and shown in various positions.
Figure 10B:
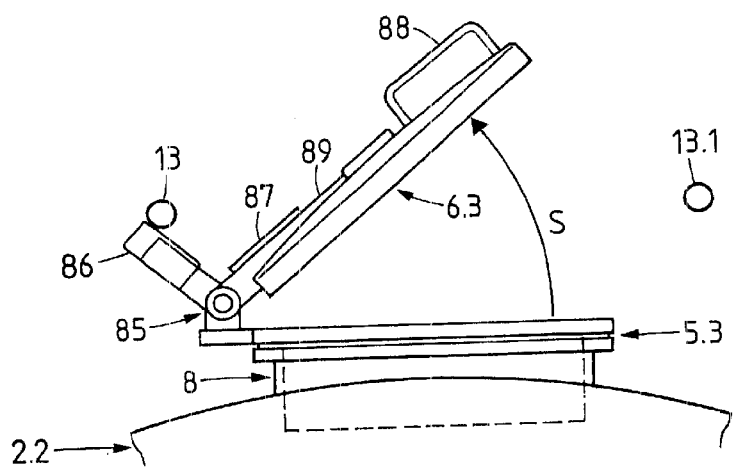

FIG. 10A shows a portion of the schematically illustrated loading station 10 with mountings 11 and 11.1 in spaced-apart relationship for two guide rails oriented in inbound direction and designated with 13 as well as 13.1. Further shown is the schematically illustrated container 2.2 with the filling pipe 5.3 as well as the attached cover 6.3 in closed position. Arranged at the filling pipe 5.3 is a schematically illustrated pivot bearing 85 which is provided with a lever arm 86. The pivot bearing 85 further includes a carrier arm 89 secured to the cover 6.3 and the operatively connected therewith. The cover 6.3 has a substantially hood-shaped configuration and has arranged thereon a plate-shaped glide piece 87 which is secured by not shown means. A grip 88 may be arranged and secured on the side of the cover 6.3 opposite to the pivot bearing 85.

Both guide rails 13 and 13.1, which are oriented in the loading station 10 in travel direction according to FIG. 1 and secured in a manner not shown in more detail, are designed and arranged in such a way as to engage, in dependence on the pivot bearing 85 arranged at the container 2.2, either the one guide rail 13 or the opposite other guide rail 13.1, when the individual railway car enters the loading station 10 or leaves.

Figure 10C:
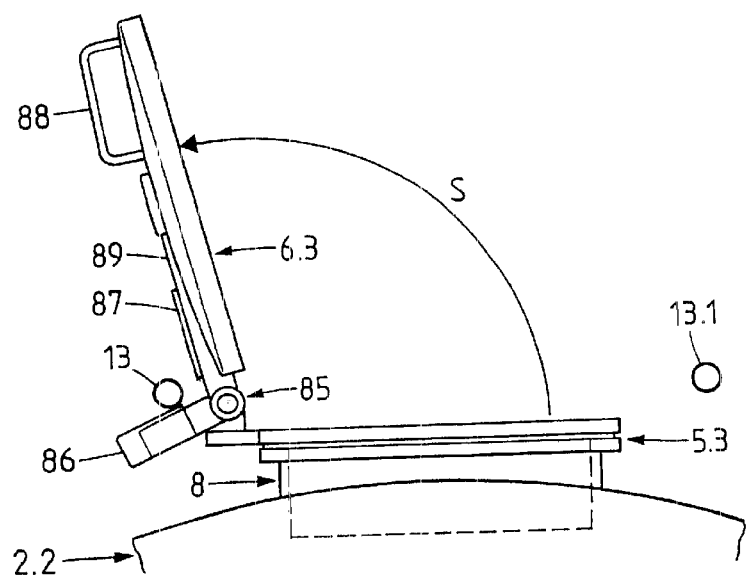
Figure 10:
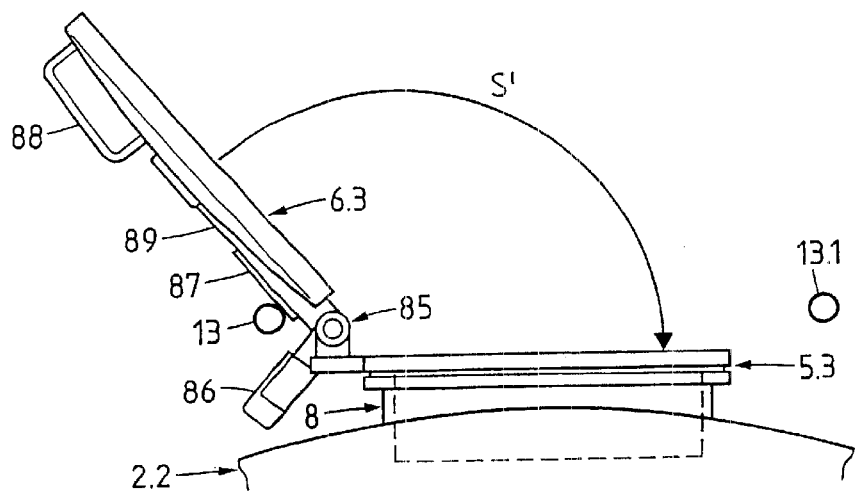
Figure 10:
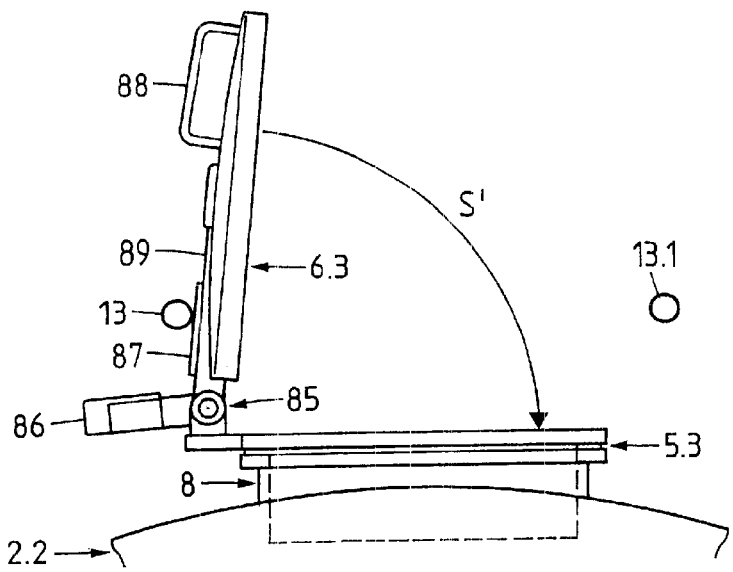
Figure 10:
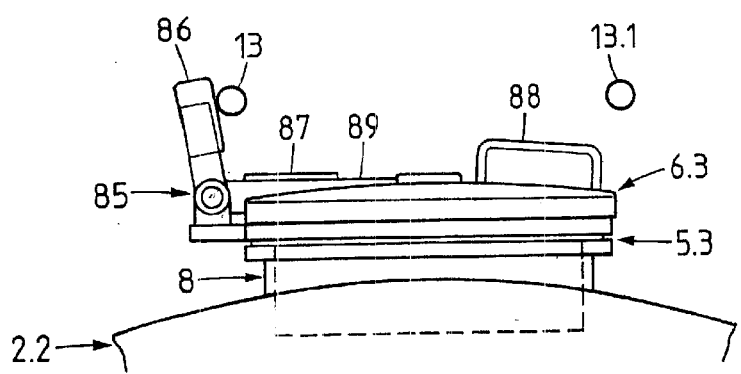

The cover 6.3, illustrated in FIG. 10A in closed state, is shown in FIGS. 101B and 10C according to arrow direction S in randomly selected intermediate position and in FIG. 10D in maximum opened end position. During the opening procedure, the cover 6.3 is swung open by means of the guide rail 13, pressing against the lever arm 86, about the not shown rotation axis of the pivot bearing 85 relative to the filling pipe 5.3, until reaching the end position according to FIG. 10D, in which the container 2.2 is charged. After charging, the railway car is further advanced and, as shown in FIGS. 10D and 10E, the cover 6.3 is hereby pivoted in arrow direction S' as a consequence of the pressure by the guide rail 13 against the glide piece 87, and the cover 6.3 is brought into closing engagement with the filling pipe 5.3 (FIG. 10F).

The covers 63 (FIGS. 9A, 9B) described herein in detail and designed as weather protection and arranged upon the railway car or the like, or the cover 6.3 (FIGS. 10A to 10E) are made, for example of light metal (cast aluminum) or of suitable plastic material. The single cover 6.3 or 63 may be secured to the filling pipe by not shown means in form-fitting manner or force-looking manner.

The operating or handling module 80 (robot), arranged, for example, at the loading station 10 and schematically illustrated in FIG. 8, for the operation of the pivot assembly 65 (FIG. 5) or the pivot assembly 65.1 (FIGS. 9A and 9B) as well as the individual mountings 11 and 11.1 arranged at the loading station 10 and provided with guide rails 13 and 13.1 according to FIGS. 10A to 10F, which are attached thereto and oriented in transport direction, are not subject matter of the present invention and therefore not described in more detail.

While the invention has been illustrated and described as embodied in a closing device for a filling pipe arranged on a container on a rail-bound or road vehicle, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. Closing device for a filling pipe for charging powder-like or granular bulk material comprising;
    at least one filling pipe adapted to be arranged on a container for transport to a loading station, said pipe provided with an inlet opening in communication with an interior of the container and closeable on the outside by a cover;
    a closure element adapted to be supported in the container interior by a carrier arm and configured for engagement in and disengagement from a circular ring shaped sealing surface associated to the inlet opening and in dependence on a pivot movement of the carrier arm, said pivot movement is oriented in a substantially horizontal plane, wherein the sealing surface is provided on one of an end of a hollow cylindrical insert member which is in coaxial relationship to the filling pipe, or on an end of the filling pipe which projects into the container interior.

2. Closing device according to claim 1, further comprising a pivot assembly arranged at a container wall at a distance to the filling pipe and accommodating an axle arranged in axis-parallel relationship to the filling pipe and rotatable about a longitudinal axis thereof, wherein the axle has one end configured for support of the carrier arm, which is pivotable together with a closure element in horizontal plane, and another end provided with a head piece for attachment of an actuating means.

3. Closing device according to claim 2, wherein the carrier arm, operatively connected to the pivot assembly with the attached closure element is manually actuatable by auxiliary means arranged on a head piece.

4. Closing device according to claim 3, wherein the head piece is polygonal-shaped.

5. Closing device according to claim 2, wherein the carrier arm, operatively connected to the pivot assembly with the attached closure element is actuatable by means of a handling module provided with an electromotive drive and movable to a polygonal-shaped head piece.

6. Closing device according to claim 5, wherein the handling module, provided with the electromotive drive, is provided at the loading station for engagement and disengagement with the head piece to thereby activate the pivot assembly.

7. Closing device according to claim 1, wherein the substantially disk-shaped closure element is supported by a tubular pipe arranged on the forward end of the carrier arm for sealing engagement with the circular ring shaped sealing surface of an insert member and resulting from an adjustable return force of a compression spring arranged in the tubular pipe.

8. Closing device according to claim 7, wherein the closure element is slidingly guided by a holding device, which is provided with two slide rails.

9. Closing device according to claim 8, wherein the closure element is slidingly guided in abutting disposition by action of the compression spring when the closure element is pivoted relative to the insert member in horizontal plane.

10. Closing device according to claim 7, wherein the closure element is supported upon the tubular pipe for rotation in horizontal plane independent of the pivot movement of the carrier arm and relative thereto.

11. Closing device according to claim 1, wherein the closure element is substantially disk-shaped and provided with a sealing ring which is in operative communication closed position with the sealing surface of the insert member in.

12. Closing device according to claim 11, wherein the sealing ring is exchangeably secured to the disk-shaped closure element.

13. Closing device according to claim 1, wherein the insert member provided with the inlet opening, is insertable for retrofitting in the filling pipe arranged on the container and replaceably secured by means of mountings, said mountings are arranged on an outer container wall and spaced from one another in circumferential direction of the filling pipe.

14. Closing device according to claim 1, wherein the cover is disposed to the outside of the filling pipe for upward pivoting in substantially vertical direction relative to the inlet opening for charging the container.

15. Closing device according to claim 1, wherein the filling pipe is provided with a pivot bearing operatively connected to the cover and associated with a lever arm engageable with at least one guide rail provided in the loading station and oriented in travel direction for automatically opening and closing the cover.

16. Closing device according to one of claim 15, wherein the cover is configured for weather protection and of a material selected from the group consisting of light metal, plastic or weatherproof material and held on the filling pipe by one of form-fitting or force-looking means.

17. Closing device according to claim 15, wherein the pivot bearing is connected to the lever arm optionally on one of side or an opposite side of the filling pipe and in dependence thereon is engageable with one of the first guide rail oriented in travel direction or with the second guide rail arranged in parallel spaced-apart relationship thereto in travel direction and configured in analogous manner.

18. Closing device according to claim 2, wherein the cover is operatively connected with the axle of the pivot assembly, said cover is liftable in vertical direction in a first phase relative to the inlet opening for charging of the container and is pivotable in a second phase relative to the inlet opening.

19. Closing device according to claim 1, wherein the cover is disposed on the filling pipe in a sealing manner with a seal arranged on an inner side thereof and configured a circular ring shape.

20. Closing device according to claim 19, wherein the cover is configured as weather protection and made of from a material selected from the group consisting of flight metal, plastic or weather-proof material and held with one of form-fitting means or force-locking means.

21. Closing device according to claim 18, wherein the pivot assembly provided with the axle configured so that the cover liftable in the first phase in substantially vertical direction relative to the inlet opening, is swingable in horizontal plane relative to the inlet opening, and in the second phase swingable together with the closure element which is arranged in the container interior upon the carrier arm.

22. Closing device according to claim 18, wherein the cover is secured with at least one carrier arm disposed thereon to a bearing sleeve arranged in coaxial relationship with the axle of the pivot assembly, wherein the cover is liftable relative to the inlet opening of the filling pipe by the return force of a compression spring supported by the bearing sleeve and by the axle.

23. Closing device according to claim 22, wherein the cover is lifted relative to the inlet opening by means of the return force of the compression spring when a screw piece arranged on a thread of the axle is loosened by auxiliary means arranged on the head piece and by the pivot movement of the cover together with the closure element respectively oriented relative to the inlet opening in horizontal plane.

24. Closing device according to claim 2, wherein the handling module is provided with an electromotive drive and movable toward the headpiece for a rotational movement of the axle.

25. Closing device according to claim 3, wherein the auxiliary means are configured for manual operation.

26. Closing device according to claim 25, wherein the closure element is connected the container interior as well as the cover which is arranged on the outside of the filling pipe for use with a container designed for loading and unloading and arranged on a rail-bound or road vehicle.

* * * * *